March 23, 1926.
J. MRAZ ET AL
1,578,153
SIEVE CLEANER
Filed July 11, 1924      2 Sheets-Sheet 2
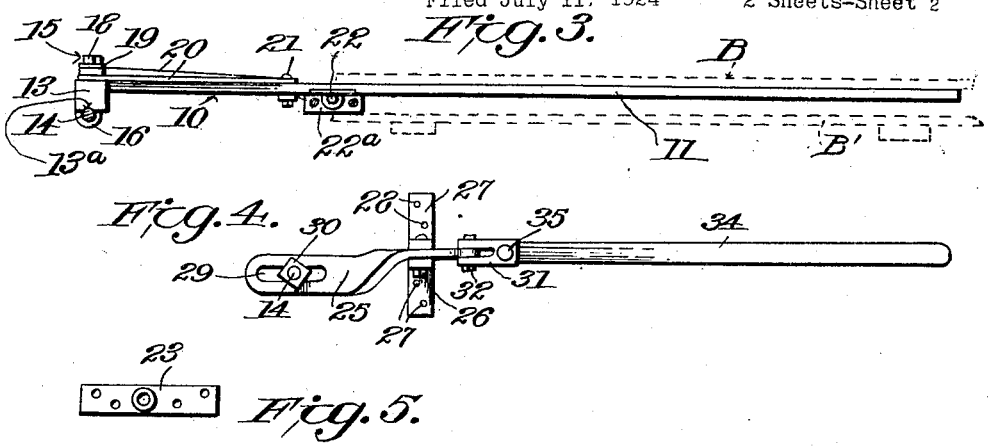
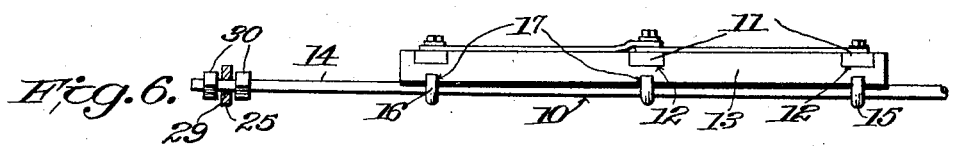
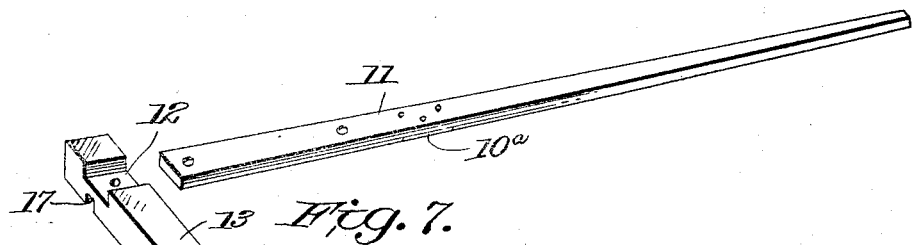
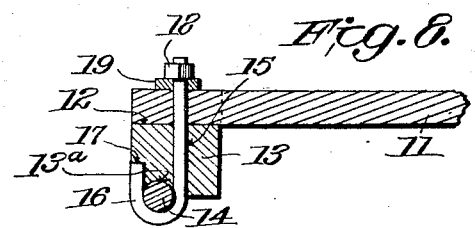
Inventors
John Mraz and
Julius Stedel,
By
Attorney Patented Mar. 23, 1926.

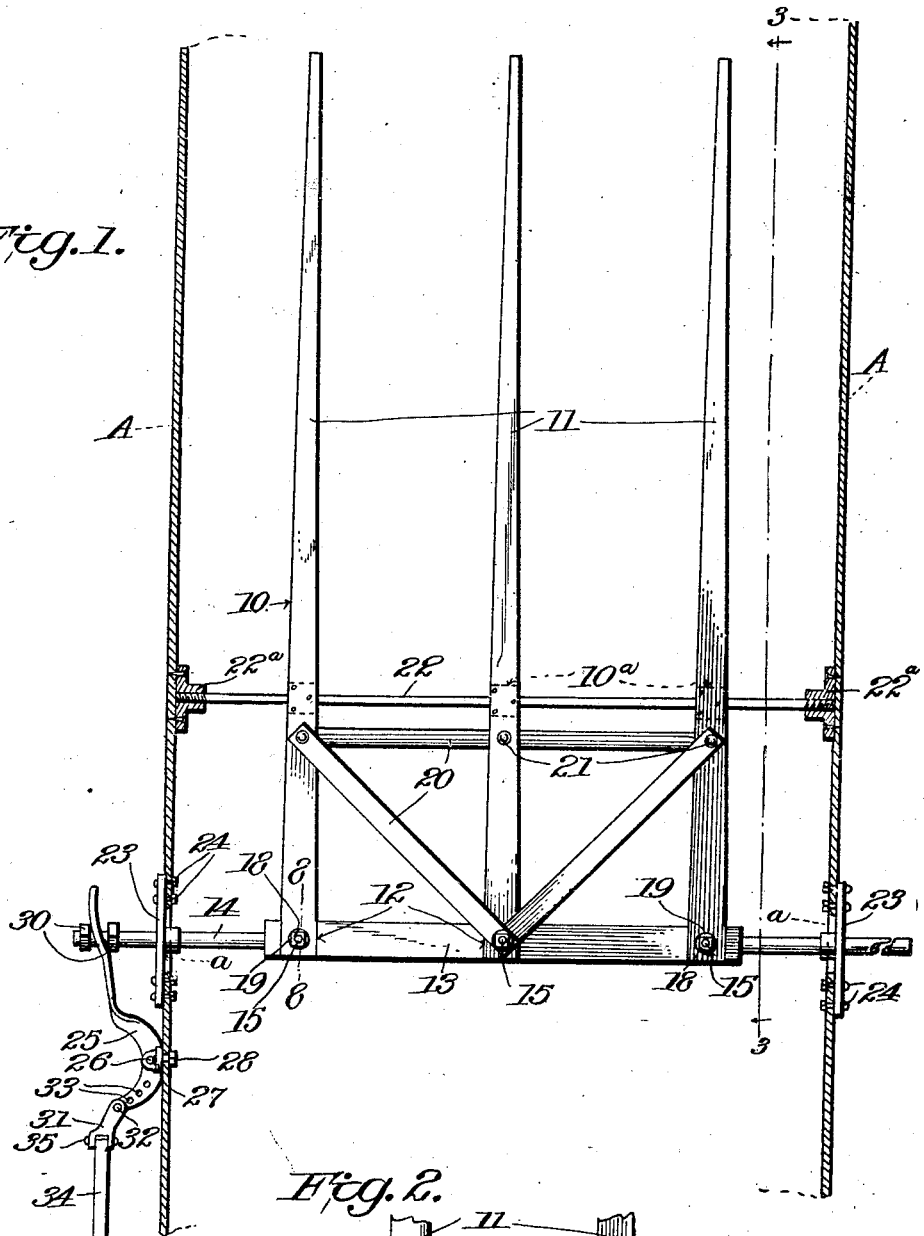

1,578,153

UNITED STATES PATENT OFFICE.

JOHN MRAZ AND JULIUS STEDEL, OF BASHAW, ALBERTA, CANADA.

SIEVE CLEANER.

Application filed July 11, 1924. Serial No. 725,443.

*To all whom it may concern:*

Be it known that we, JOHN MRAZ and JULIUS STEDEL, subjects of the King of Great Britain, residing at Bashaw, in the Province of Alberta, Dominion of Canada, have invented certain new and useful Improvements in a Sieve Cleaner, of which the following is a specification.

This invention relates to a cleaning apparatus or device designed to clean the sieve particularly of a grain separating machine and to maintain such sieve clean during operation of the machine so that the sieve meshes cannot become clogged and the grain caused to follow the straw and become lost or wasted.

Another object is to provide a construction which particularly coacts as an attachment with a well-known make of grain separator so that it may be readily applied thereto and supported without alteration of its parts.

A further object is to provide a novel form of reciprocatory means movable over and against one surface, preferably the under surface, of the upper sieve of a pair.

Still further, it is aimed to provide a novel knock-down construction utilizing fingers in connection with a connecting bar and a reciprocatory rod, together with novel securing means common to all of said parts.

The more specific objects will be partly pointed out and otherwise become apparent from a consideration of the description following taken in connection with accompanying drawings illustrating an operative embodiment.

In said drawings:

Figure 1 is a plan view of the improvements in connection with fragments of a grain separator, the latter being shown in dotted lines;

Figure 2 is a fragmentary inverted plan view of the cleaner, particularly showing the connection of the fingers, connecting bar and reciprocatory rod;

Figure 3 is a section taken on the line 3—3 of Figure 1 with coacting parts of a grain separator shown in dotted lines;

Figure 4 is a side view of the means for operating the reciprocatory rod;

Figure 5 is a front view of one of the bearings for the reciprocatory rod;

Figure 6 is a rear end view of the device, partly broken away and partly in section;

Figure 7 is a detail perspective view suggesting the knockdown construction of the device as regards the fingers and connecting bar; and Figure 8 is a section view taken on the line 8—8 of Figure 1.

Referring specifically to the drawings wherein like reference characters designate like or similar parts, the sides of a grain separator are conventionally suggested at A having hand-holes *a* therethrough to facilitate access to the mechanism of the separator. A sieve means for that separator is shown as upper and lower sieves at B and B' in Figure 3. These parts are conventional and are found in at least one type of grain separator. They are shown as my particular construction coacts therewith although the principles thereof are not so limited.

A skeleton sieve cleaner body is generally shown at 10. This body may have a plurality of fingers or tines 11, usually three as shown, removably fitted in mortises 12 of a connecting bar 13. Tines 11 and bar 13 are usually made of wood while the remaining parts hereinafter described are usually made of metal. The bar 13 is disposed on and rigidly and removably secured to and partly in countersunk engagement at 13ᵃ with a reciprocatory rod 14. Hook bolts 15 may be removably passed through openings in the connecting bar 13 and proximal ends of the tines 11. The hooks 16 of said bolts clamp around the rod 14 and their distal ends enter notches 17 of the connecting bar so that the hooks cannot turn and so that they cannot if they should loosen slip transversely off of the rod. The upper ends of the bolts 15 are screw threaded and receive nuts 18 thereon, preferably over washers 19. These bolts are thus common fastening means for all of these parts and exceedingly rigidly connect them together as well as permitting disassembly for storage or transportation, in that knocked-down, they will occupy minimum space. These parts may be suitably braced, as by the system of braces 20 bolted to the parts of the frame 10 at 21. Said fingers 11 as shown in Figure 3 are in wiping contact with the sieve B as shown in Figure 3, preferably at the under or lower surface.

Supplementing the rod 14 in supporting the frame 10 at metallic wear plates 10ᵃ is a rest rod 22 which is removably disposed and oppositely screw-threaded into brackets 22ª screwed or otherwise fastened to the sides A.

Bearings or plates 23, one of which is detailed in Figure 5 are bolted or otherwise fastened against the exterior of the walls A as at 24 and the rod 14 is journalled therein for sliding or reciprocatory movement. Said rod passes through the handholes a.

As one means of reciprocating rod 14, a lever 25 is pivoted to one of the sides A as by a vertical pin 26 secured to lugs 27 bolted at 28 to said side. The said lever adjacent one end has an elongated slot 29 through which rod 14 passes and the rod has nuts or abutments 30 screw threaded thereon to complete the connection between the rod and the lever. This lever may be actuated in any desired manner. For instance a link 31 has a vertical pin 32 selectively pivoting it in openings 33 of said lever and a bar 34 is secured to the link by a horizontal pin or pivot 35. This forms a substantially universal connection. Bar 34 may be attached to an operating part of the grain separator, for instance the straw-shifting rod or the crank shaft arm.

In operation, the lever 25 is oscillated or rocked back and forth during operation of the grain separator to which it is attached in the manner previously suggested. Motion of the said lever 25 reciprocates rod 14 and accordingly the frame 10, moving the fingers 11 over the adjacent surface of the sieve B and thereby keeping the sieves clean by preventing clogging of the meshes of the sieves. The fingers 11 dislodge any straw or other particles which may occupy the meshes. When each sieve is thus kept clean, considerable grain is saved since with a clogged sieve, the grain would be carried over with the straw and be wasted or lost.

The parts all being detachable from the separator and from each other as previously suggested, may be readily knocked down or disassembled so that they will occupy minimum space for storage or shipment.

What is claimed is:—

In combination with a separator or the like provided with hand holes through its frame and a sieve within the frame; plates covering said holes and detachably connected to the frame, a reciprocatory rod supported by said plates, a cleaner for the sieve, said cleaner being located within the frame and detachably secured to the rod, a rest rod for the cleaner within and fastened to the frame in spaced relation to the reciprocatory rod, and means to operate the reciprocatory rod.

In testimony whereof we have affixed our signatures.

J. MRAZ.
JULIUS STEDEL.